United States Patent [19]
McCarthy

[11] Patent Number: 5,838,451
[45] Date of Patent: Nov. 17, 1998

[54] OPTOELECTRONIC SPECTRAL ANALYSIS SYSTEM

[75] Inventor: Cornelius J. McCarthy, Pittsford, N.Y.

[73] Assignee: Accuracy Microsensors, Inc., Pittsford, N.Y.

[21] Appl. No.: 698,419

[22] Filed: Aug. 15, 199

Related U.S. Application Data

[60] Provisional application No. 60/011,160 Dec. 22, 1995. 6

[51] Int. Cl.⁶ ..................................................... G01N 21/25
[52] U.S. Cl. ........................... 356/406; 356/407; 356/402
[58] Field of Search ..................................... 356/402, 406, 356/407

[56] References Cited

U.S. PATENT DOCUMENTS

| | | | |
|---|---|---|---|
| 3,994,590 | 11/1976 | Di Martini et al. | 356/178 |
| 4,699,510 | 10/1987 | Alguard | 356/73 |
| 4,986,665 | 1/1991 | Yamanishi et al. | 356/402 |
| 5,137,364 | 8/1992 | McCarthy | 356/402 |
| 5,175,697 | 12/1992 | Kawagoe et al. | 364/526 |
| 5,229,814 | 7/1993 | Taranowski et al. | 356/406 |

*Primary Examiner*—David C. Nelms
*Assistant Examiner*—Zandra V. Smith

[57] ABSTRACT

Improved apparatus for low cost measurement of spectral intensity distribution of light energy reflected from surfaces of or transmitted through objects or materials, using solid state emitters and detectors. The measurement results remain consistent in spite of variations in component characteristics or temperature.

24 Claims, 9 Drawing Sheets

OPTOELECTRONIC SPECTRAL ANALYSIS SYSTEM

DESCRIPTION

This application claims priority benefit of pending provisional application Ser. No. 60/011,160 filed on Dec. 22, 1995.

FIELD OF INVENTION

The present invention relates to an apparatus for measurement of spectral distribution of light energy reflected from surfaces of or transmitted through objects, using solid state emitters and detectors. The invention is especially suitable for use in obtaining low cost optoelectronic spectral analysis systems for measurement or detection of color of objects, whereby the measurement results remain consistent in spite of variations in component characteristics or temperature.

BACKGROUND, FEATURES AND BRIEF DESCRIPTION OF EMBODIMENTS OF THE INVENTION

Although the normal human vision is highly capable of perception of brightness and hue of color, or of distinguishing color differences, it is less capable of providing quantification or recalling the color characteristics. A class of instruments such as densitometers, colorimeters, spectrophotometers, spectrometers, radiometers, and chroma meters is available to perform these functions. Such instruments, generally designed for use in laboratories, tend to be expensive, large and heavy, and require skilled operators. The present invention relates to improved measuring instruments of this class that can provide color measurements at low cost, and particularly to improved optical spectral analysis apparatus incorporating at least two solid state radiation sources, such as light emitting diodes, and at least one solid state radiation detector. Apparatus of the type, related to the present invention, was described in the U.S. Pat. No. 5,137,364. This invention discloses improved apparatus designed to better perform the same as well as certain additional functions.

Figure 1:
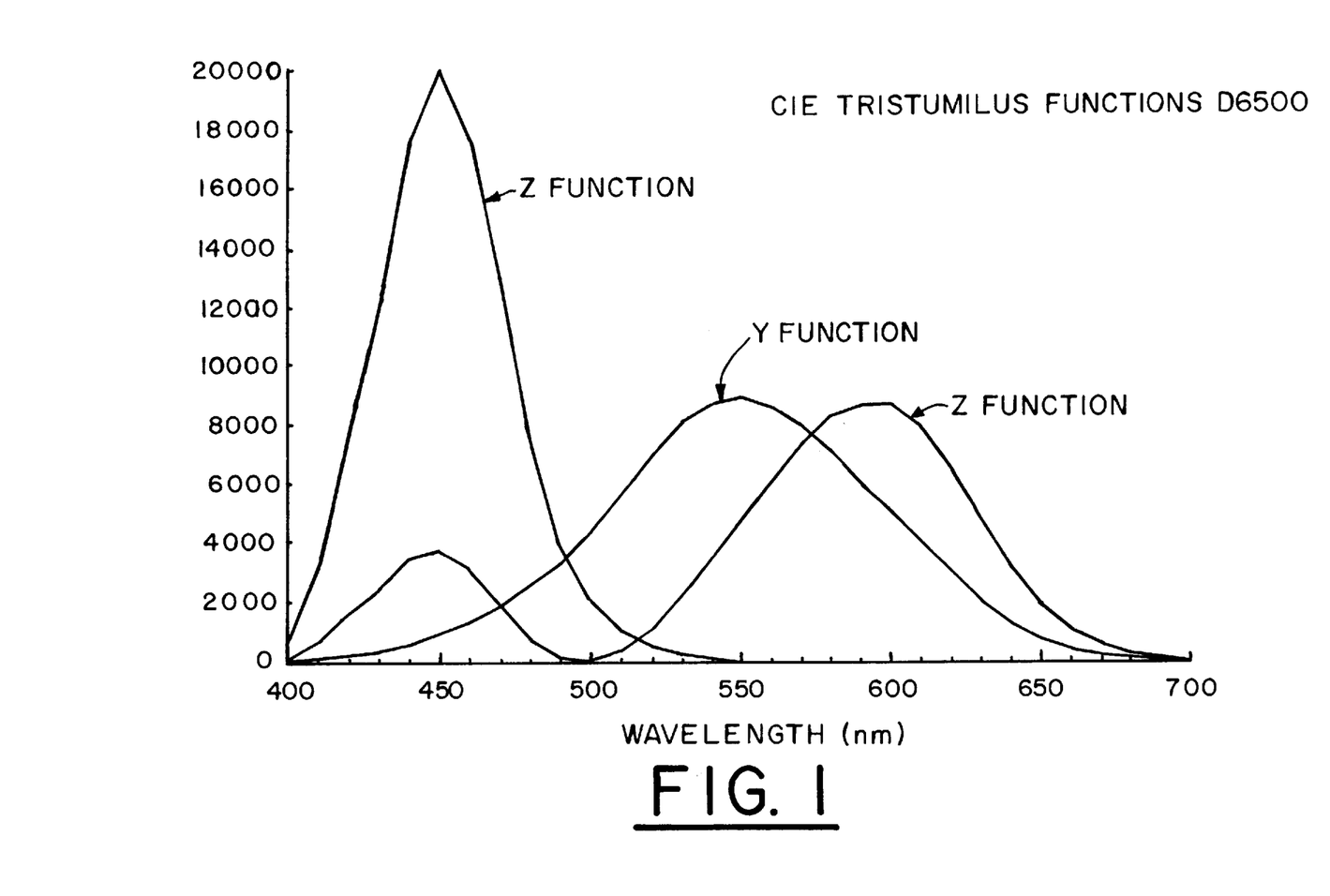
FIG. 1 is a set of standard CIE tristimulus curves representing functions that can be used to describe parameters of color.

In many applications it is desired to prepare or make available materials with a specific color or to estimate the differences between two colors as perceived by a person, as for example, in matching color of paints. For these cases the optimal response functions of a improved color measuring apparatus are defined by colorimetry, published by the Commission Internationale de l'Eclairage (CIE), and are accepted as international standards. FIG. 1 shows a typical set of CIE curves expressing the so-called tristimulus values (x, y, z) vs. wavelength. "The tristimulus colorimetry is based on the assumption that any color can be matched by a suitable combination of three primary colors ("stimuli") —generally red, green and blue." (The Photonics Design and Application Handbook, p. H-45). Note that the y-curve has a peak around 550 nm. The visible light spectrum resulting from combinations of individual colors, as, for example, emitted by light emitting diodes (LEDs), used to match colors of objects, forms the physical basis for improved color measuring apparatus, in accordance with the present invention.

Figure 2:
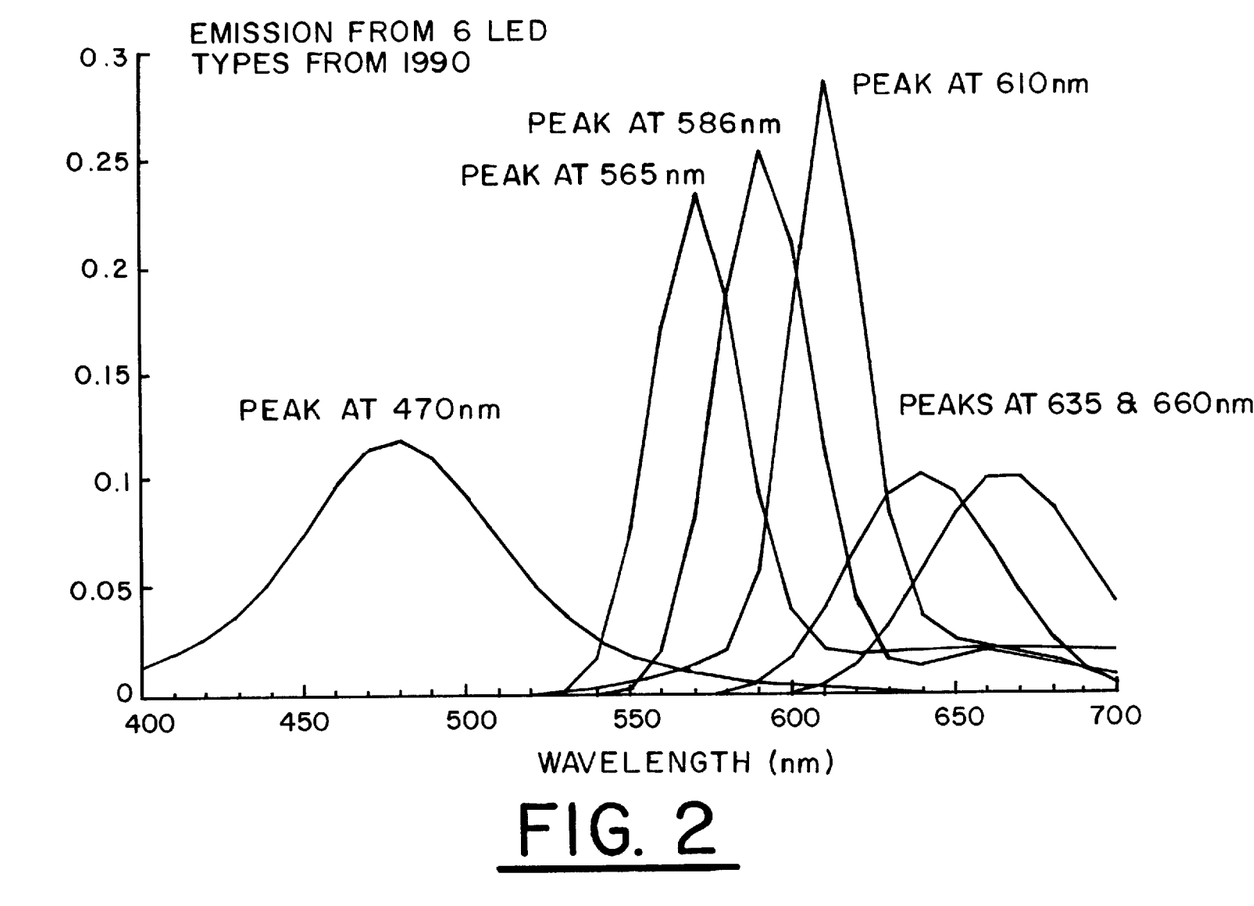
FIG. 2 shows the emission spectra of the emitters available at the time of the application for the U.S. Pat. No. 5,137,364.

Previously, in apparatus of this type, to cover the important spectral region around 550 nm, it was necessary to use of multiple emitters and detectors with peak responses outside of that spectral region, but whose response curves extended in various degrees into this region. FIG. 2 shows the emission spectra for several solid state emitters (LEDs) used in the apparatus in accordance with prior art. Note that there is a sharp gap in the 500 to 560 nm region, leading in certain applications to a marginal performance of the color measuring apparatus per U.S. Pat. No. 5,137,364 in this wavelength range.

Figure 3:
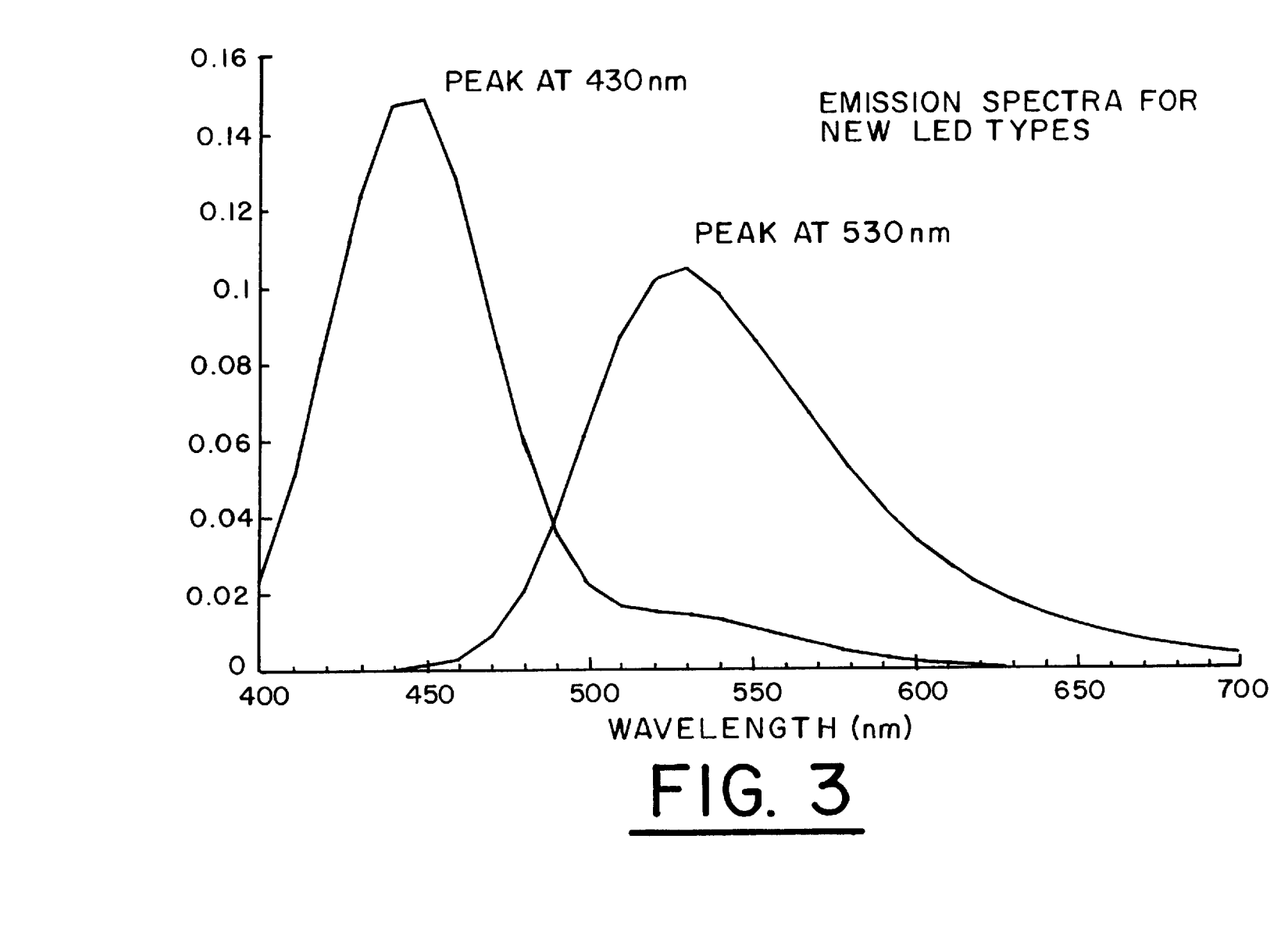
FIG. 3 shows typical emission spectra of LEDs generating light with spectral peaks at 430 nm and 530 mn.

The LEDs with peak light emission in the region of 560 to 700 nm are made from semiconductors such as GaP, GaAsP, and GaAlAs. LEDs with peak light emissions at 430 and 530 nm made from silicon carbide (SiC) are now available. FIG. 3 shows typical emission spectra for these two devices. The use of the 530 nm LED allows an optimal coverage of the spectral region represented by the tristimulus y-curve, that was inadequately covered in previously available color measuring apparatus that uses LEDs as light sources.

Figure 4:
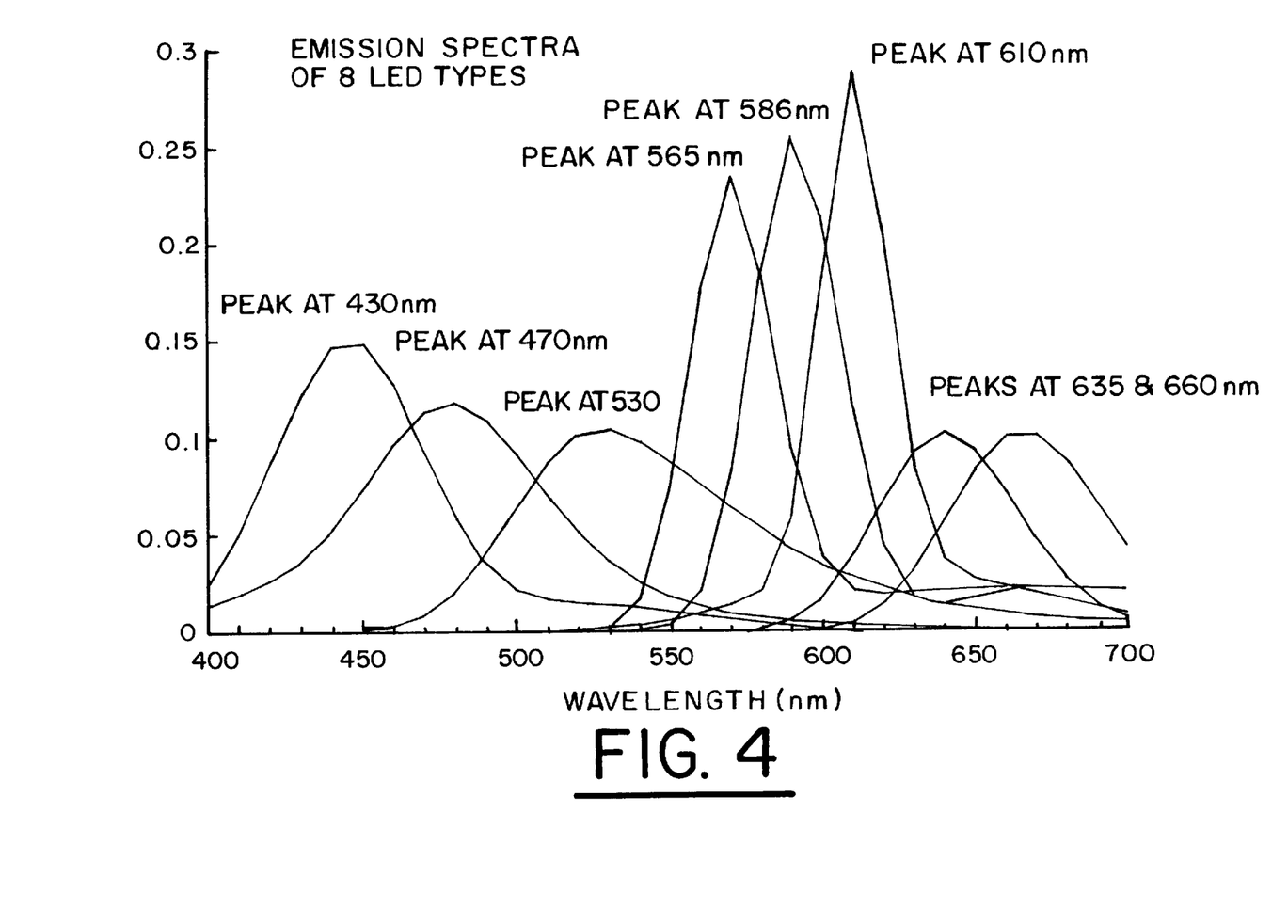
FIG. 4 depicts a combined emission spectrum resulting from the addition of 430 nm and 530 nm emitters to the complement of the emitters, the spectral output of which is shown in FIG. 2

The improved color measuring apparatus (optoelectronic spectral analysis system), according to this invention, includes at least one each LED with peak energies of the emission spectrum at 430 and 530 nm. FIG. 4 shows the combined spectral output when the 430 nm and 530 nm emitters are added to the improved color measuring apparatus with a complement of emitters generating light the spectral composition of which is depicted in FIG. 3.

As discussed in U.S. Pat. No. 5,137,364, stable performance of emitters and detectors, despite of temperature variations, is necessary to ensure consistent and accurate measurement results when using this type of apparatus. This objective can be achieved by incorporating in the improved color measuring apparatus a color sensor in which the emitters and detectors are mounted on a common substrate and sensing the temperature of this substrate with a sensor bonded or otherwise fastened to the substrate. The temperature information can be used in several ways, discussed below, to obtain adequate temperature compensation of emitters and detectors.

In addition, it is desirable to be able to calibrate the individual emitters and detectors such as to obtain agreement with application-specific standards. This function and temperature compensation are accomplished by coupling said improved color measuring apparatus to a digital processor (microprocessor). In this configuration the optical and thermal characteristics of the improved color measuring apparatus can be determined during manufacturing and stored in the memory of the microprocessor. In use the microprocessor then calculates from raw measurements results and the stored apparatus-specific data the measurement results and presents them in a desired format (e.g., CIE).

Thermal compensation can, for example, be accomplished by using the electrical signal from a temperature sensor, such as a thermistor, to compute appropriate weighting factors and use them in the microprocessor to compensate the electrical outputs of said detector to achieve temperature-stable operation. Alternately, if sufficient power is available, such as in instruments operated from an electrical power line, the current through the emitters can be varied in response to the signals from said temperature sensor, to influence the heating of these devices due to the current flowing through them, such that the substrate is maintained at a constant temperature and, consequently, the temperature of the devices located on this substrate.

Figure 5:
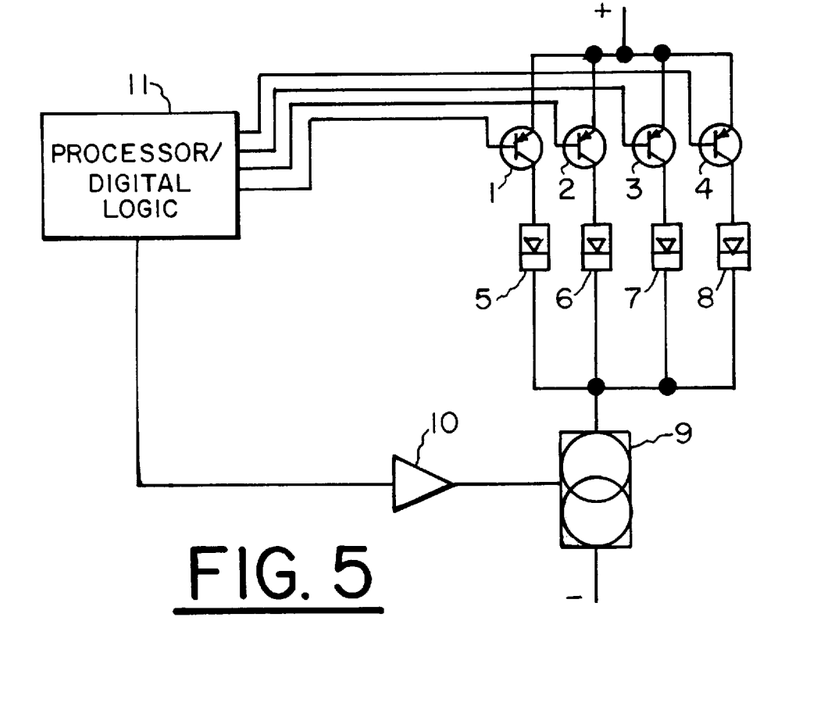
FIG. 5 is an electrical diagram of a circuit designed for sequential actuation of emitters or emitter groups, each generating light in a certain spectral range.

The emitters of the sensors can be operated in several modes in accordance with the invention, namely:

A. Where the mode of operation is one in which the multiplicity of emitters in said color sensor are turned on sequentially in a rapid succession and one color at a time. The electronic circuit to accomplish this is shown in FIG. 5. Depending on the efficiency of the emitters in a particular wavelength range, improved color measuring apparatus may include several emitters of a given type (emitting light with the same spectral energy distribution). The microprocessor "knows" via its programming which color emitter or a group of emitters is turned on at a given moment and applies a weighted integrating function to the output of a given detector so as to achieve a certain overall transfer function that affects the measurement results. The electrical signal representing a specific wavelength region of the light reflected from the surface of the object or material or transmitted through the object or material, the color of which is to be determined, is therefore a product of a weighting function and the electrical signal generated by detector or detectors responsive to the light of a specific wavelength range reflected from said surface illuminated by an emitter or a group of emitters or transmitted through an object. From the value of said electrical signal and knowing to which emitter and detector are involved to generate it, the microprocessor computes the value of the color component to be then displayed in a desired format. This sequence is repeated for each color generated by said emitter or emitter group such that an indication of color hue and brightness is obtained as a result.

This arrangement, because of its low power consumption, is especially suited for improved color sensors used in portable, battery-operated color measuring apparatus.

Figure 6:
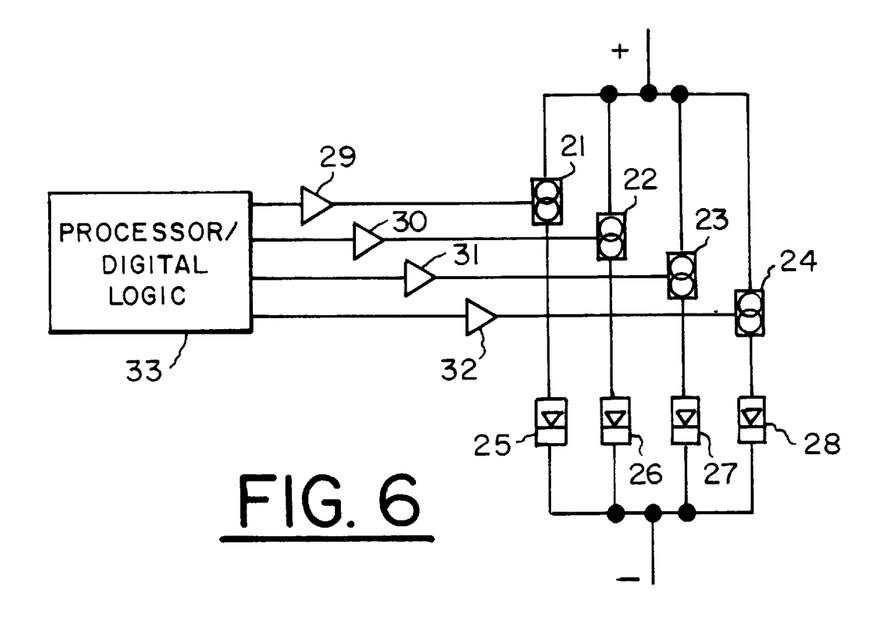
FIG. 6 illustrates an example of the circuit that would be employed to achieve emitter operation in which the a set of the emitters generating different colors would be turned on simultaneously to achieve a spectral output that would closely approximate a standard function, such as a CIE tristimulus function.

B. In an alternate mode of emitter operation, groups of emitters generating light of different colors are turned on at the same time (FIG. 6). Improved color sensors generating a light output with a spectral energy distribution that would closely approximate, say, one of three tristimulus functions depicted in FIG. 1 are therefore achieved. For example, the light output whose spectral energy distribution would conform to the y-curve could be generated by controlling the magnitude of current flowing through the 530 nm emitter to achieve a maximum light output, and setting the current through the 430 nm emitter such as to get, say, 10% of the maximum output, while leaving the red emitter turned off. Other spectral energy distributions, such as those corresponding to the x- and z-curves, of the illuminating light would be similarly achieved by appropriately weighting the output of selected emitters or emitter groups. The result of this process is that the electrical output signals representing for the reflected light the spectral energy distributions in each spectral range would conform to the CIE tristimulus standard from which it would be easy to compute the color parameters of the surface being measured.

As compared to the mode of emitter operation described in A above, this approach has the advantage that a sequence of only three measurements for x, y and z responses would be required to determine the color parameters, instead of a multiplicity of measurements, one for each emitter or emitter group generating light in a given spectral range. Thus it would be possible to carry out the measurements much more rapidly. This mode of operation, however, requires more power and is, therefore, more appropriate for implementation in apparatus operated from a power line rather than a battery.

Figure 7A:
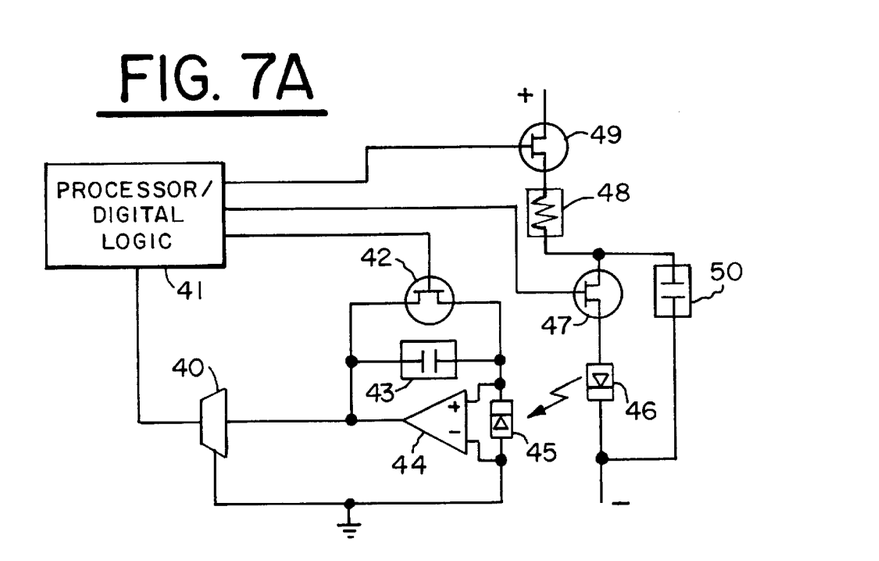
FIG. 7A depicts an example of electrical circuit that could be used to achieve a mode of emitter operation in which each emitter or a group of emitters is fired by a current flowing through it from a capacitor pre-charged from a constant voltage source, and an integrating detector circuit to be used in conjunction with operation of the emitters in said mode.
Figure 7B:
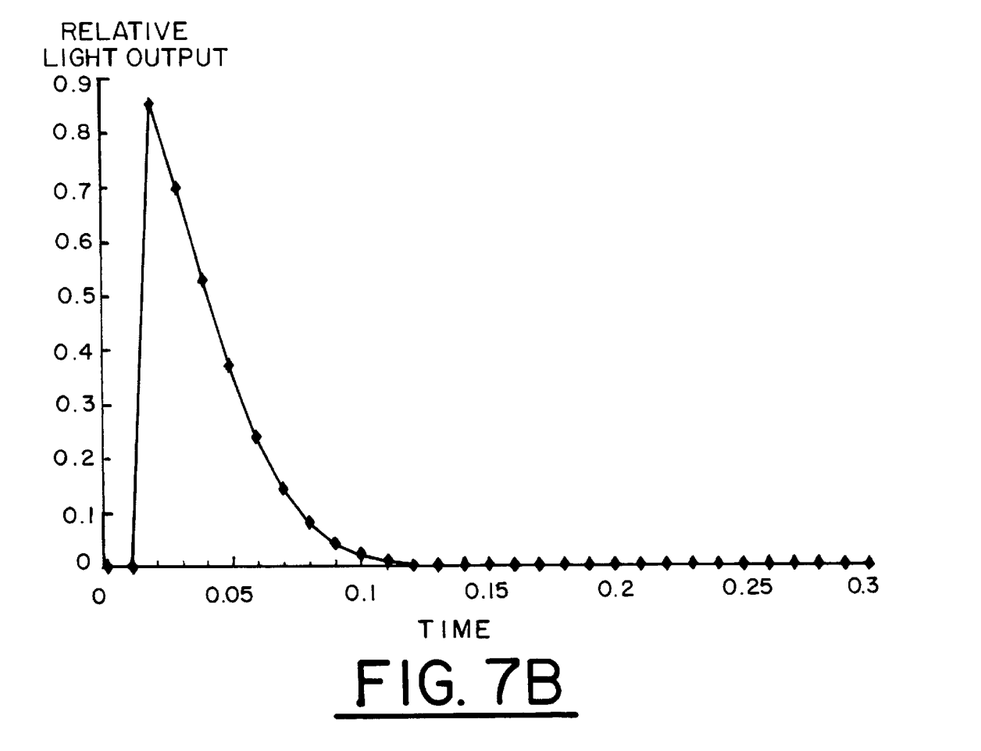
FIG. 7B is a curve which shows the variation with time in each firing cycle of an emitter or a group of emitters in the emitted radiant energy.

C. Yet another mode of emitter operation, applicable to both above described modes A and B, involves actuating an emitter by discharging electrical current through it from a previously charged capacitor (FIGS. 7A and 7B). This mode of operation would be also applicable to a group of emitters. When fully charged from a constant voltage source, a capacitor stores an electrical charge of known magnitude. By passing the fixed charge through a solid state emitter, such as an LED, the total output of radiant energy from said emitter will be accurately known. Furthermore, since the total light output is maximum for a given input of electrical energy, the operation is, therefore optimally efficient. To take advantage of this mode of operation, integrating detector(s) would be employed. The emitters or emitter groups could be fired sequentially as in A or simultaneously as in B. Appropriate weighting functions would also be applied to achieve the desired output formats.

D. A further mode of emitter operation can serve two purposes, depending on the implementation. In the first implementation of this mode all said emitters are driven with alternating or pulse current to generate a light output modulated at the frequency or the repetition rate of the input current. Using this modulation as a marker it becomes possible to improve the signal-to-noise ratio by separating useful signal from the noise due to stray light, a feature especially important when operating instruments, subject of this invention, in environments where the undesirable effects of the ambient light are not easily controlled.

In the second implementation of this mode, each emitter or a group of emitters that generate light of a given color, is driven with alternating or pulse currents, each such current modulated by a signal of a distinct frequency or repetition rate. The signals from the detector or detectors corresponding to the specific color emissions from said emitters or emitter groups would be separated using filtering or detection means familiar to those skilled in the art. Consequently, using this mode of operation, all emitters could be operating simultaneously. The advantages of this approach would be faster operation than with modes described in A and B, and, as in said first implementation, improved signal-to-noise ratio in presence of stray light.

Figure 8:
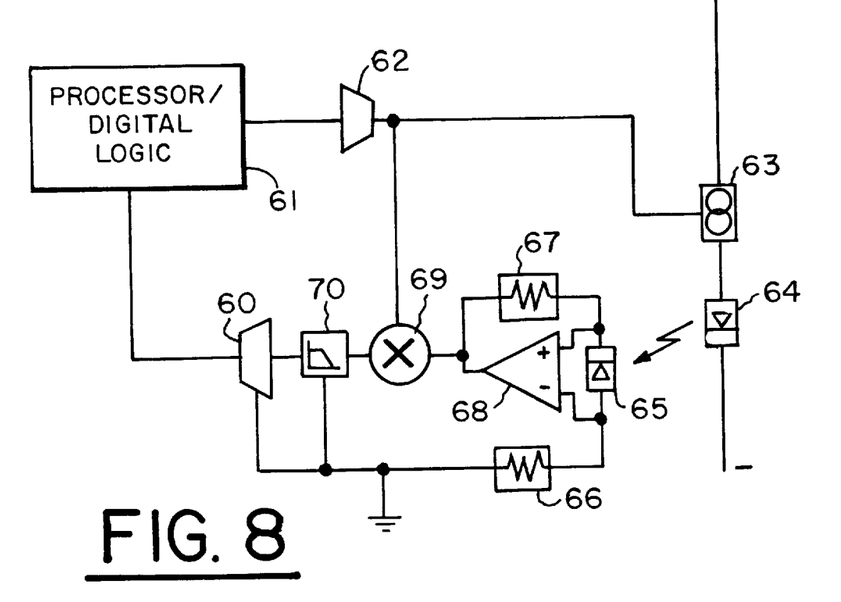
FIG. 8 is an electrical diagram of an example of a circuit in which an external source of emitter current modulation is employed to achieve a modulated radiation emission, and a circuit to separate the useful signal generated by said detector from that of the signal due to stray light, to be used in conjunction with operation of the emitters in said mode.

The signal separation can be achieved by synchronous detection, electrical filters or other means familiar to those skilled in the art. In the sequential mode of emitter operation described in 1. and 2. external modulation is provided (FIG. 8). Depending on the application, we envision two configurations of improved color measuring apparatus according to the invention, namely:

a. Apparatus for measuring light reflected from surfaces of objects or materials, and b. Apparatus for measuring light absorbance in transparent materials, such as liquids, glass, plastics, liquids, and others.

Figure 10:
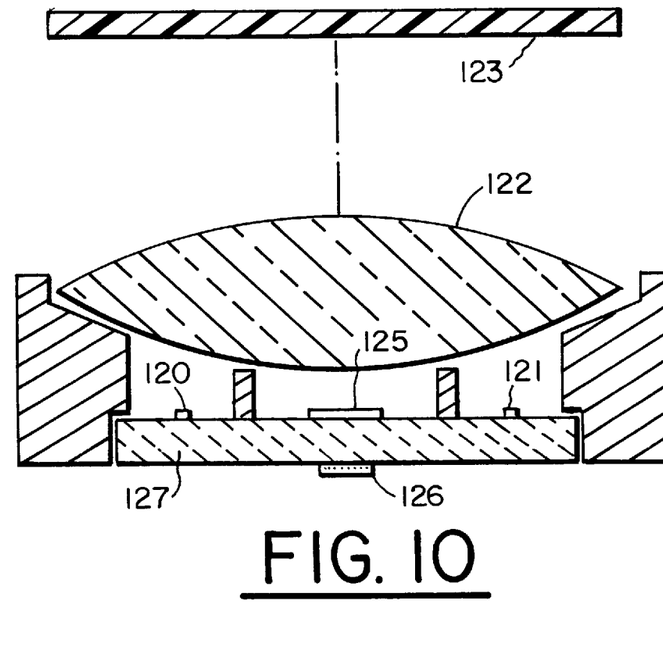
FIG. 10 depicts the configuration of the apparatus for measuring the color of objects or materials using light reflected for their surface.

In the first version diagrammatically depicted in FIG. 10, the emitters, detectors and the temperature sensor are all mounted on the same substrate. The light from the emitters is directed through an optical system to the surface of the object or material, reflected from said surface, collected by the optical system, and directed to the detector or detectors.

Figure 11:
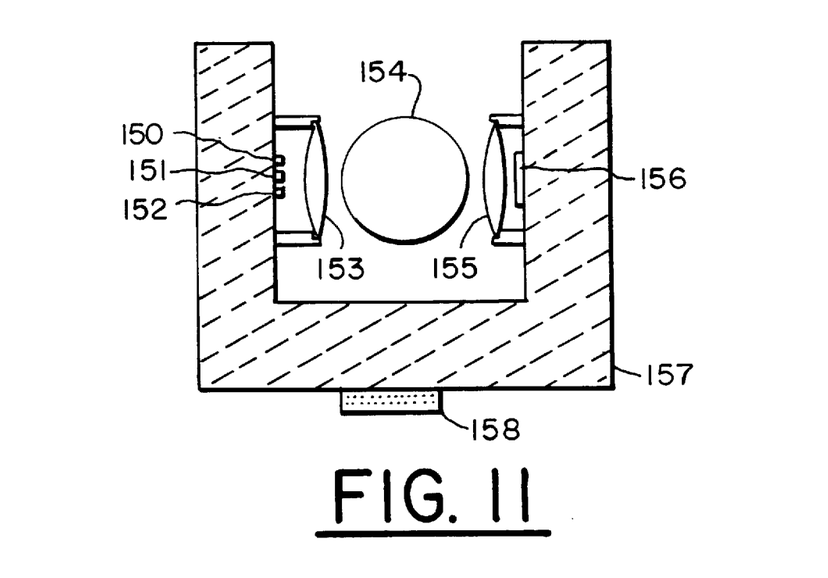
FIG. 11 depicts the configuration of the apparatus for measuring the color of transparent liquid or solid materials using light transmitted through said transparent objects or materials.
Figure 12:
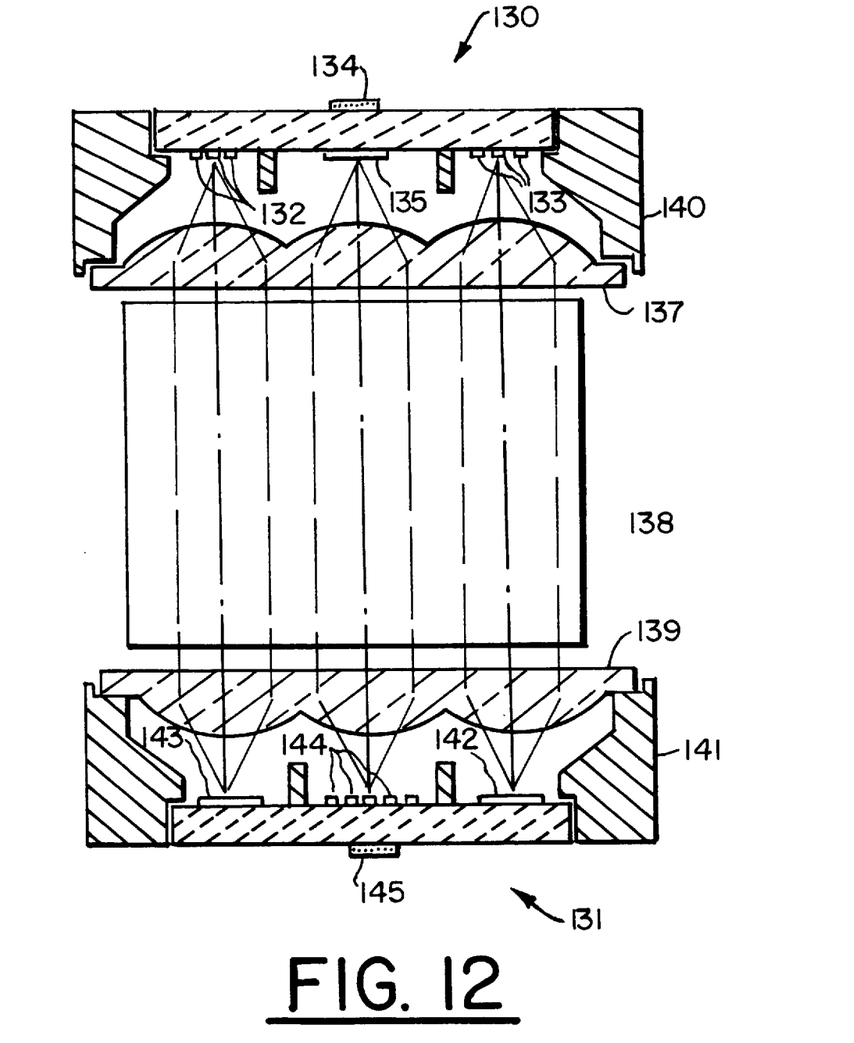
FIG. 12 shows another version of the apparatus for measuring the color of transparent liquid or solid materials using light transmitted through said transparent objects or materials in which two complete color sensors as described herein are used on the opposing sides of the sample compartment.

In the second version diagrammatically depicted in FIGS. 11 and 12. The improved color measuring apparatus of FIG. 11 comprises two distinct units sharing a common substrate: light transmitter and light receiver. The former contains the emitters and a temperature sensor mounted on a substrate, and an optical system designed to direct the light from the emitters to the transparent solid or liquid material the color of which is to be measured. The light passes through said transparent material, a part of it is absorbed, and the remainder enters said light receiver which contains detector or detectors and a temperature sensor mounted on a common substrate. The emitters and the detector or detectors are electrically connected to a control and computing unit that contains the necessary electronics, including A/D converters, power supplies, and a microprocessor.

Further improvements in performance and better temperature compensation of such apparatus for measuring the color of light-transmissive objects or materials may be obtained by mounting two complete color sensors that each include emitters, detectors and a temperature sensor, on the opposite sides of the enclosure and operating them alternately under control of the processor. This is depicted in FIG. 12.

SUMMARY OF THE INVENTION

It is one object of this invention to provide an improved color measuring apparatus that has improved capability to accurately measure colors over a wide spectral range.

Another object of this invention is to provide an improved color measuring apparatus which includes at least one light emitter having a peak of the emission spectrum in the wavelength range of 500 nm to 560 nm.

A further object of this invention is to include in said apparatus at least one additional light emitter having a peak of the emission spectrum in the wavelength range of 550 nm to 700 nm.

Still further object of this invention is to include in said apparatus at least one additional light emitter having a peak of the emission spectrum in the wavelength range below 500 nm.

An additional object of this invention is to include in said apparatus light emitters which are light emitting diodes.

A further object of this invention is to provide said apparatus in which the individual light emitters or groups of light emitters that generate light of one selected color are turned on sequentially.

An additional object of this invention for said improved color measuring apparatus is to include temperature control or temperature compensation of the common substrate on which the light emitters and detectors are mounted in good thermal contact, thus ensuring stable operation and repeatable results in spite of temperature variation.

Another object of this invention is to electrically control in said improved color measuring apparatus the optical output of the light emitters in an operational mode in which at least two light emitters are energized simultaneously, so as to achieve, alternatively to said sequential mode of light emitter operation, a combined light output, the spectral energy distribution of which conforms to a predetermined desired spectral energy distribution.

A further object of this invention is to incorporate in said improved color measuring apparatus a microprocessor to provide controlling and computational functions.

Yet an additional object of this invention is to increase a power efficiency of said improved color measuring apparatus to operate said light emitters in said apparatus such that said light emitters are sequentially or simultaneously turned on by discharging through said light emitters current previously stored in capacitors that have been charged from a constant voltage source; and to employ in that case integrating detectors.

Another object of this invention is to improve the signal-to-noise ratio of said apparatus operating where extraneous light may leak into detectors by modulating the optical output of said light emitters and using electrical filtering means, following detection, to separate the useful signal from noise.

An additional object of this invention in a mode in which said light emitters are turned on simultaneously, is to separate the electrical signals generated by said detectors, corresponding to the different color of the light generated by said light emitters by using modulation of different frequency or repetition rate for each individual light emitter or a group of light emitters of generating light of a given color.

A further object of this invention is to provide improved color measuring apparatus for using light reflected from surfaces of materials or objects to measure the color of said materials or objects.

Yet another object of this invention is to provide improved color measuring apparatus for using light transmitted through transparent solid or liquid materials or to measure the color of said solid or liquid materials.

It should be understood that the invention may be practiced to carry out one or more, but not necessarily all, of the objects of the invention set forth above.

In summary therefore, this invention relates to an improved color measuring apparatus. The improvements provided are in enhancing the accuracy and the range of applications of the apparatus by including emitters that generate radiation in the 500 nm to 560 nm spectral range and by incorporating means for operating the emitters in is a several different modes that offer significant advantages in certain applications. Versions of said apparatus are disclosed that are designed measuring color of reflecting objects and materials and color of objects and materials that transmit light.

BRIEF DESCRIPTION OF THE DRAWINGS

The present invention will be more fully understood with reference to the following detailed description thereof, when read in conjunction with the attached drawings, wherein like reference numerals refer to like elements, and wherein.

DESCRIPTION OF THE PREFERRED EMBODIMENTS

The first objective of the present invention, to produce apparatus with improved color measuring and matching performance, is achieved by adding solid state emitters (e.g., LEDs) generating light at 430 nm and 530 nm. FIG. 4 shows the results in terms of the combined spectral distribution of using a complement of eight emitters, each generating light with distinct peak wavelength in the visible range. With this arrangement a complete coverage of the spectral range of interest in achieved. It is to be understood that while FIG. 4 illustrates that such complete coverage is feasible with the appropriate selection of emitters, in many applications fewer than eight emitters would be necessary to achieve the desired color measuring or matching performance. By applying suitable weighting functions to the output of said selected emitters many useful spectral intensity distributions may be realized. Some of the means for doing so are described below.

The schematic diagram in FIG. 5 shows one implementation of said improved color measuring apparatus for rapid and sequential activation of individual emitters. Four emitters 5, 6, 7 and 8 are shown. The turn on and off of said emitters is controlled respectively by transistor switches 1, 2, 3 and 4. Said switches in turn are controlled by the processor 11. All four of said emitters are jointly connected to a programmable current sink 9. Since only one of said emitters is turned on at a time, only the current from that emitter flows through said current sink. The magnitude of said current and, therefore, the intensity of light generated by any one of said emitters when it is on. Said programmable current sink is controlled via a D/A converter 10 by said processor, in such a manner that the current through each said emitter is appropriately adjusted by said processor to achieve the desired intensity of light output so as to achieve the required spectral distribution.

FIG. 6 depicts the schematic diagram of a circuit that could be used to operate all or groups of emitters 25, 26, 27 and 28 simultaneously. The current to each emitter flows through individual controllable current sources 21, 22, 23 and 24 that are controlled through D/A converters 29, 30, 31 and 32 by the processor 33. In this manner the current flowing through each said emitters 25, 26, 27 and 28 can be set to a certain value to generate light output from any one emitter with a desired intensity level. Thus, an overall spectral output can be achieved which corresponds to a standard function, such as the CIE tristimulus function, or a special function to suit a particular application.

A circuit for operating said improved color measuring apparatus in a different mode is shown schematically in FIG. 7A. The object of this circuit is to fire the emitters, such as the emitter 46, by discharging through it a capacitor 50 via the transistor switch 47 controlled by the processor 41. Said capacitor 50 is charged from the positive rail through the transistor switch 49 and resistor 48. Said switch 49 is also controlled by the processor 41. Consequently, the magnitude of electrical charge on said capacitor 50 at the time of its discharge through said switch 47 and the rate of charging are determined by the value of the resistor 48 and the capacitor 50, the value of voltage on the positive rail and the timing of the controlling signals from said processor 41. Said magnitude of the electrical charge in turn determines the total energy of the light output from said emitter 46. The processor 41 also controls the number of light pulses; the change of the light output of one of such pulse is depicted in FIG. 7B, generated by said emitter 46.

The light pulses are reflected from or transmitted through an object and detected by the detector 45. The resulting pulses of electrical current are amplified and integrated in the integrating circuit comprising electronic elements 42, 43 and 44 operating in a manner well known to those skilled in the art. The output of said integrator, analog to the light intensity reflected of or transmitted through said object is converted into its digital format and fed into the processor 41 where it is used to compute the parameters of object's color and display said parameters in a desired format.

Another embodiment of the invention is shown in FIG. 8A. In this circuit the current flowing into the emitter 64 from the controlled current source 63 is modulated with a signal originating in the digitally controlled oscillator 62. The modulating signal is fed into said controlled current source 63. The output of said digitally controlled oscillator 62 is in turn controlled by the processor 61. As in the previously described embodiments, the light generated by the emitter 64 is reflected from or transmitted through an object, depending on the application, and passed on optically to the detector 65 after being reflected of transmitted through the object the color of which is being measured. The resulting electrical signal modulated at the frequency determined by the digitally controlled oscillator 62 and the processor 61, is amplified by the amplifier comprising elements 66, 67, and 68, and fed into a synchronous detector comprising elements 69 and 70, an electronic circuit element familiar to those skilled in the art. The reference signal for said synchronous detector is derived from said digitally controlled oscillator 62.

The object of this embodiment is to mark the light emanating from said emitter 64 such that on the detecting side of the circuit the signals corresponding to this light can be conveniently separated for any extraneous signals due to stray light and other factors. Thus apparatus employing this scheme would be less affected by ambient light.

Figure 9:
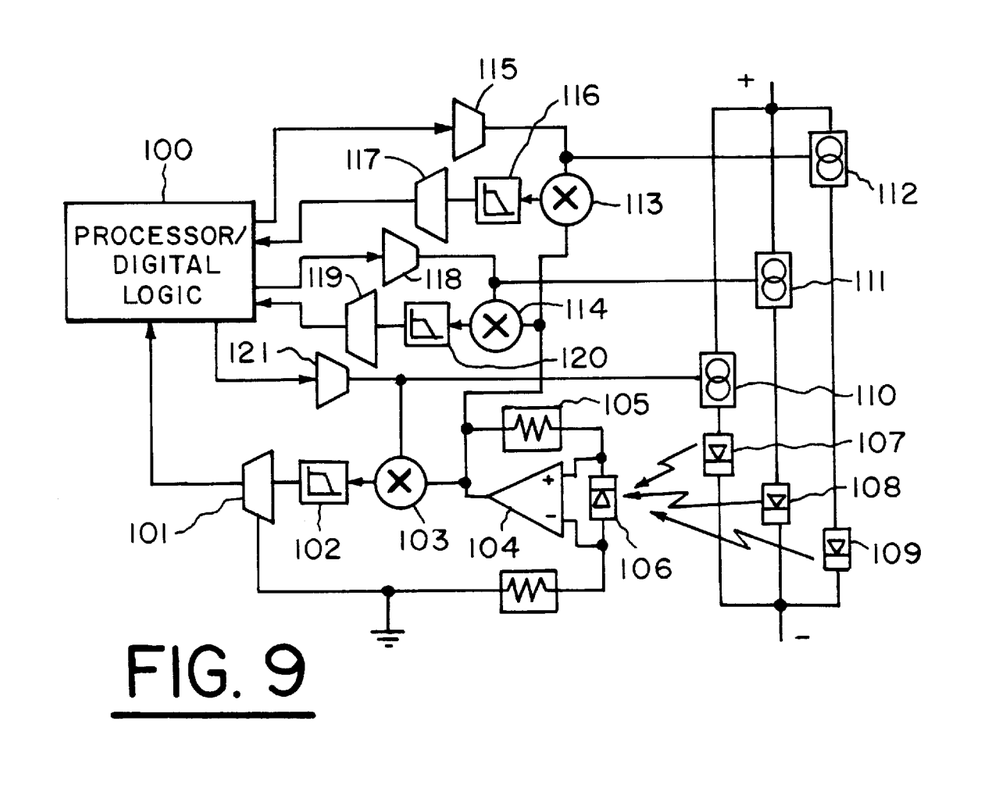
FIG. 9 is an electrical diagram of an example of a circuit to modulate the emitters at different frequencies or repetition rates of the modulating signal so as to be able to separate the signals from said detector due to different emitters, while having said emitters to be in their turned on state all at the same time.

Another object of this scheme is to mark the light signals from several individual detectors with different modulating frequencies such that these signals can be separated by using an appropriate number of synchronous detectors. Thus it would be possible to operate a number of emitters at the same time, appropriately and individually control the current through said emitters so as to obtain a combined light output in the apparatus, to represent a desired spectral function, such as CIE tristimulus function. This version of this scheme is shown in FIG. 9, where three emitter 107, 108 and 109 are operated simultaneously each modulated at a different frequency. Three separate digitally controlled oscillators 115, 118 and 121, and three separate synchronous detectors comprising elements 113 and 116; 114 and 120; and 102 and 103, respectively.

The essential mechanical, optical and photonic elements of said light sensor for operation in reflective mode are depicted diagrammatically in FIG. 10. The light that has a specific spectral peak value is generated by emitters 120 and 121 and directed by the lens 122 to the surface of the object 123 the color of which is to be measured or matched. The incident light is reflected through the lens 122 to the detector 125 which converts this reflected light into an electrical signal corresponding to the intensity of the reflected light.

The stability of this assembly is ensured by mounting all temperature-sensitive components, i.e. emitters and detectors on a common ceramic substrate and continuously measuring the temperature of this substrate using the temperature sensor 126, also bonded to said substrate. The electrical signal from said temperature sensor 126 is used by the processor mentioned in the preceding to appropriately adjust the light output of the emitters 120 and 121 and/or the amplification of the signal generated by the detector 125 in response to the incident light, so as to make the measurements independent of temperature variations.

A configuration of a compartment with light sensor for measuring color of light transmissive objects or materials is depicted diagrammatically in FIG. 11. The light generated by the emitters 150, 151, and 152 is directed by the lens 153 through the object 154, where some of this light is absorbed. The remaining light exits the object 154 and is directed by the lens 155 to the detector 156. As in the previous configuration, the stability of the operation is ensured by mounting all temperature-sensitive components on a common ceramic substrate 157 and measuring the temperature of said substrate using the temperature sensor 158.

A variation of the configuration for measuring the color of transmissive objects or materials is diagrammatically depicted in FIG. 12. In this configuration two color sensors 130 and 131, described earlier in this patent as well as the U.S. Pat. No. 5,137,364, on the opposite sides of the object 132 are employed. These color sensors can be operated alternately or simultaneously, in the latter case the emitters would be modulated at different frequencies. Note that the locations of the detectors and the emitters in the two color sensors 130 and 131 are different. The light generated by the emitters 132 and 133 of said color sensors 130 would pass through the sample 132, be attenuated, and the directed to the detectors 142 and 143 in said color sensor 131. Conversely, the light generated by the emitters 144 of said color sensor 131 would pass in the opposite direction through the sample 132, be attenuated, and the directed to the detectors 135 in said color sensor 130. The stability of operation is ensured as described above by mounting each color sensor's emitters and detector on a common substrate with a temperature sensor.

It is to be understood that the preceding descriptions are illustrative only and that changes can be made in the apparatus, its components and elements, the sequences of operation and process steps, as well as in the other aspects of the invention discussed herein without departing from the scope of the invention as defined in the claims.

I claim:

1. Apparatus for the measurement of spectral reflectance or spectral absorbance of an object or material, said apparatus comprising at least one substrate formed from material with good thermal conductivity, at least one optical radiation sensing means for converting optical energy into electrical energy, in thermal contact with at least one said substrate, optical means for directing light from said object or material to said optical radiation sensing means, a computing means for processing said electrical energy in order to derive information regarding spectral properties of said object or material, at least one first means for converting electrical energy to optical energy in thermal contact with at least one said substrate, which optical energy provided by said first means for converting electrical energy to optical energy has a spectral output in which the peak wavelength of its emission spectrum is in the range from 500 nm to 550 nm and in which the full width at half height of its emission spectrum is at least 40 nm, at least one second means for converting electrical energy to optical energy in thermal contact with at least one said substrate, which optical energy provided by said first means for converting electrical energy to optical energy has a spectral output with the peak of its emission spectrum in the range from 550 nm to 700 nm and in which the full width at half height of the curve representing said emission spectrum is at least 30 nm, such that the outputs of said first and second means for converting electrical energy to optical energy partially overlap each other in the distribution with respect to the wavelength of their emissions, a function residing in said computing means to combine using mathematics of linear algebra electrical energies generated by said optical radiation sensing means in response to the light reflected from or transmitted through said objects or materials such the combined response resulting from said combination corresponds to illumination of said object or material with light the spectral distribution of which has a peak between 525 and 570 nm and a full width at half height of the distribution curve of at least 90 nm.

means for directing optical energy from said first and second means for converting electrical energy to optical energy to said object, and at least one temperature sensor for detecting the temperature of each said substrate.

2. Apparatus per claim 1 wherein said optical means includes means operative for using light reflected from the surfaces of objects.

3. Apparatus per claim 1 wherein said optical means includes means operative for using light transmitted through objects.

4. Apparatus per claim 1 in which said first and second means for converting electrical energy to optical energy include light emitting diodes.

5. Apparatus per claim 1 in which said first means for converting electrical energy to optical energy is a light emitting diode in which the active substance is silicon carbide.

6. Apparatus per claim 1 in which said optical radiation sensing means is a photodiode.

7. Apparatus per claim 1 in which said optical radiation sensing means is a phototransistor.

8. Apparatus per claim 1 in which said temperature sensor is a thermistor.

9. Apparatus per claim 1 incorporating at least one analog-to-digital converter to convert analog signals from said optical radiation sensing means and from said temperature sensor into digital format.

10. Apparatus per claim 1 in which electrical outputs of said optical radiation sensing means and those of said temperature sensors of each said substrate are connected to said computing means through said analog to digital converter, said computing means being responsive to said temperature for deriving correction factors, and said optical radiation sensing means have their spectral responses calibrated as a function of the temperature of each substrate at the time of manufacture, the derived correction factors for the spectral response as a function of temperature are stored in the memory of said computing means, and said spectral responses are corrected as a function of temperature at the time of use of said apparatus.

11. Apparatus per claim 1 in which said optical radiation sensing means are controlled by computing means, and said temperature sensor is connected to said computing means through said analog to digital converter and the temperature of the substrate is controlled automatically by said computing means by activation of said means for converting electrical energy to optical energy before and after each measurement in order to generate heat and to keep said substrate at a constant temperature.

12. Apparatus per claim 1 in which said first and second means for converting electrical energy to optical energy and further comprising additional optical radiation sensing means and said computing means is programmed to activate multiple means for converting electrical energy to optical energy simultaneously to produce combined optical output the spectral composition of which conforms to a predetermined spectral energy distribution.

13. Apparatus per claim 12 in which first and second means for converting electrical energy to optical energy are energized by passing through them alternating or pulsating electrical current at predetermined frequency or repetition rate so as to modulate the optical output at said predetermined frequency or repetition rate, said frequency or repetition rate being unique for each first and second means for converting electrical energy to optical energy, said apparatus also includes means for demodulating electrical signals generated by said optical radiation sensing means, and means for separating electrical outputs from said optical radiation sensing means in accordance with said frequency or repetition rate.

14. Apparatus per claim 12 in which first and second means for converting electrical energy to optical energy are energized by passing through them alternating or pulsating electrical current at predetermined frequency or repetition rate so as to modulate the optical output at said predetermined frequency of repetition rate, said frequency or repetition rate being the same for each first and second means for converting electrical energy to optical energy, said apparatus also includes means for demodulating electrical signals generated by said optical radiation sensing means, and means for separating electrical outputs from said optical radiation sensing means in accordance with said frequency or repetition rate.

15. Apparatus per claim 1 wherein a program stored in said computing means electrically controls the outputs of said means for converting electrical energy to optical energy enables said means for converting electrical energy to optical energy to be activated simultaneously, in accordance with said program so as to produce a desired combined optical output from said means for converting electrical energy to optical energy, the spectral composition of said optical output conforms to a predetermined spectral energy distribution.

16. Apparatus per claim 15 in which first and second means for converting electrical energy to optical energy are energized by passing through them alternating or pulsating electrical current at predetermined frequency or repetition rate so as to modulate the optical output at said predetermined frequency or repetition rate, said frequency or repetition rate being unique for each first and second means for converting electrical energy to optical energy, said apparatus also includes means for demodulating electrical signals generated by said optical radiation sensing means, and means for separating electrical outputs from said optical radiation sensing means in accordance with said frequency or repetition rate.

17. Apparatus per claim 15 in which first and second means for converting electrical energy to optical energy are energized by passing through them alternating or pulsating electrical current at predetermined frequency or repetition rate so as to modulate the optical output at said predetermined frequency of repetition rate, said frequency or repetition rate being the same for each first and second means for converting electrical energy to optical energy, said apparatus also includes means for demodulating electrical signals generated by said optical radiation sensing means, and means for separating electrical outputs from said optical radiation sensing means in accordance with the frequency or repetition rate of the optical energy received by said means for converting optical energy into electrical energy.

18. Apparatus per claim 1 further comprising electrical charge storage means which can be charged and discharged in which said first and second means for converting electrical energy to optical energy are energized by passing through them electrical current from said electrical storage means.

19. Apparatus per claim 18 in which said charge storage means are charged from a constant voltage source.

20. Apparatus per claim 1 in which said optical radiation sensing means are integrating photodiodes and further comprising electrical storage means which can be charged and discharged in which said first and second means for converting electrical energy to optical energy are energized by passing through them electrical current from said electrical charge storage means.

21. Apparatus per claim 1 in which first and second means for converting electrical energy to optical energy are energized by passing through them alternating or pulsating electrical current at predetermined frequency or repetition rate so as to modulate the optical output at said predetermined frequency or repetition rate, said frequency or repetition rate being unique for each first and second means for converting electrical energy to optical energy, said apparatus also includes means for demodulating electrical signals generated by said optical radiation sensing means, and means for separating electrical outputs from said optical radiation sensing means in accordance with said frequency or repetition rate received by said optical radiation sensing means.

22. Apparatus per claim 1 in which first and second means for converting electrical energy to optical energy are energized by passing through them alternating or pulsating electrical current at predetermined frequency or repetition rate so as to modulate the optical output at said predetermined frequency or repetition rate, said frequency or repetition rate being the same for each first and second means for converting electrical energy to optical energy, said apparatus also includes means for demodulating electrical signals generated by said optical radiation sensing means, and means for separating electrical outputs from said optical radiation sensing means in accordance with said frequency or repetition rate.

23. Apparatus per claim 1 in which said means for converting electrical energy to optical energy and optical radiation sensing means are disposed on the opposite sides of a light-transmissive object, and for which said means for converting electrical energy to optical energy and said detectors are mounted to a common substrate with said temperature sensor of said substrate.

24. Apparatus per claim 1 in which on each of two opposing sides of a light-transmissive object is disposed an assembly comprising means for converting electrical energy to optical energy, optical radiation sensing means, and temperature sensors, each said assembly bonded or otherwise attached to a separate substrate in such a manner that the optical energy generated by the means for converting electrical energy to optical energy in the assembly on each side is directed through said light-transmissive object to the optical radiation sensing means in the assembly on the other side of said light-transmissive object.

* * * * *